United States Patent
Akkarakaran et al.

(10) Patent No.: US 12,149,458 B2
(45) Date of Patent: Nov. 19, 2024

(54) SIDELINK PRIMARY COMPONENT CARRIER FOR CARRIER AGGREGATION

(71) Applicant: QUALCOMM Incorporated, San Diego, CA (US)

(72) Inventors: Sony Akkarakaran, Poway, CA (US); Hua Wang, Basking Ridge, NJ (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/650,764

(22) Filed: Feb. 11, 2022

(65) Prior Publication Data

US 2023/0261813 A1     Aug. 17, 2023

(51) Int. Cl.
*H04L 5/00* (2006.01)
*H04W 72/0453* (2023.01)

(52) U.S. Cl.
CPC ......... *H04L 5/001* (2013.01); *H04W 72/0453* (2013.01)

(58) Field of Classification Search
CPC ..... H04L 5/001; H04L 5/0033; H04L 5/0094; H04W 72/0453
See application file for complete search history.

(56) References Cited

U.S. PATENT DOCUMENTS

| | | | |
|---|---|---|---|
| 2020/0396717 A1* | 12/2020 | Luo | H04L 5/0092 |
| 2021/0028912 A1* | 1/2021 | Xu | H04L 5/001 |
| 2023/0089990 A1* | 3/2023 | Feng | H04W 72/12 370/329 |
| 2023/0309116 A1* | 9/2023 | Pan | H04L 5/001 |

FOREIGN PATENT DOCUMENTS

| | | |
|---|---|---|
| WO | WO-2022032050 A1 | 2/2022 |
| WO | WO-2023075665 A1 * | 5/2023 |

OTHER PUBLICATIONS

International Search Report and Written Opinion—PCT/US2023/061444—ISA/EPO—Jun. 2, 2023.

* cited by examiner

*Primary Examiner* — Chae S Lee
(74) *Attorney, Agent, or Firm* — Harrity & Harrity, LLP

(57) ABSTRACT

Various aspects of the present disclosure generally relate to wireless communication. In some aspects, a first user equipment (UE) may obtain an indication of a primary component carrier for a sidelink communication using carrier aggregation. The first UE may transmit the sidelink communication to a second UE using the primary component carrier. Numerous other aspects are described.

30 Claims, 9 Drawing Sheets

SIDELINK PRIMARY COMPONENT CARRIER FOR CARRIER AGGREGATION

FIELD OF THE DISCLOSURE

Aspects of the present disclosure generally relate to wireless communication and to techniques and apparatuses for a sidelink primary component carrier for carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include obtaining an indication of a primary component carrier for a sidelink communication using carrier aggregation. The method may include transmitting the sidelink communication to a second UE using the primary component carrier.

Some aspects described herein relate to an apparatus for wireless communication performed by a first UE. The apparatus may include a memory and one or more processors, coupled to the memory. The one or more processors may be configured to obtain an indication of a primary component carrier for a sidelink communication using carrier aggregation. The one or more processors may be configured to transmit the sidelink communication to a second UE using the primary component carrier.

Some aspects described herein relate to a non-transitory computer-readable medium that stores a set of instructions for wireless communication by a first UE. The set of instructions, when executed by one or more processors of the first UE, may cause the first UE to obtain an indication of a primary component carrier for a sidelink communication using carrier aggregation. The set of instructions, when executed by one or more processors of the first UE, may cause the first UE to transmit the sidelink communication to a second UE using the primary component carrier.

Some aspects described herein relate to an apparatus for wireless communication. The apparatus may include means for obtaining an indication of a primary component carrier for a sidelink communication using carrier aggregation. The apparatus may include means for transmitting the sidelink communication to a UE using the primary component carrier.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
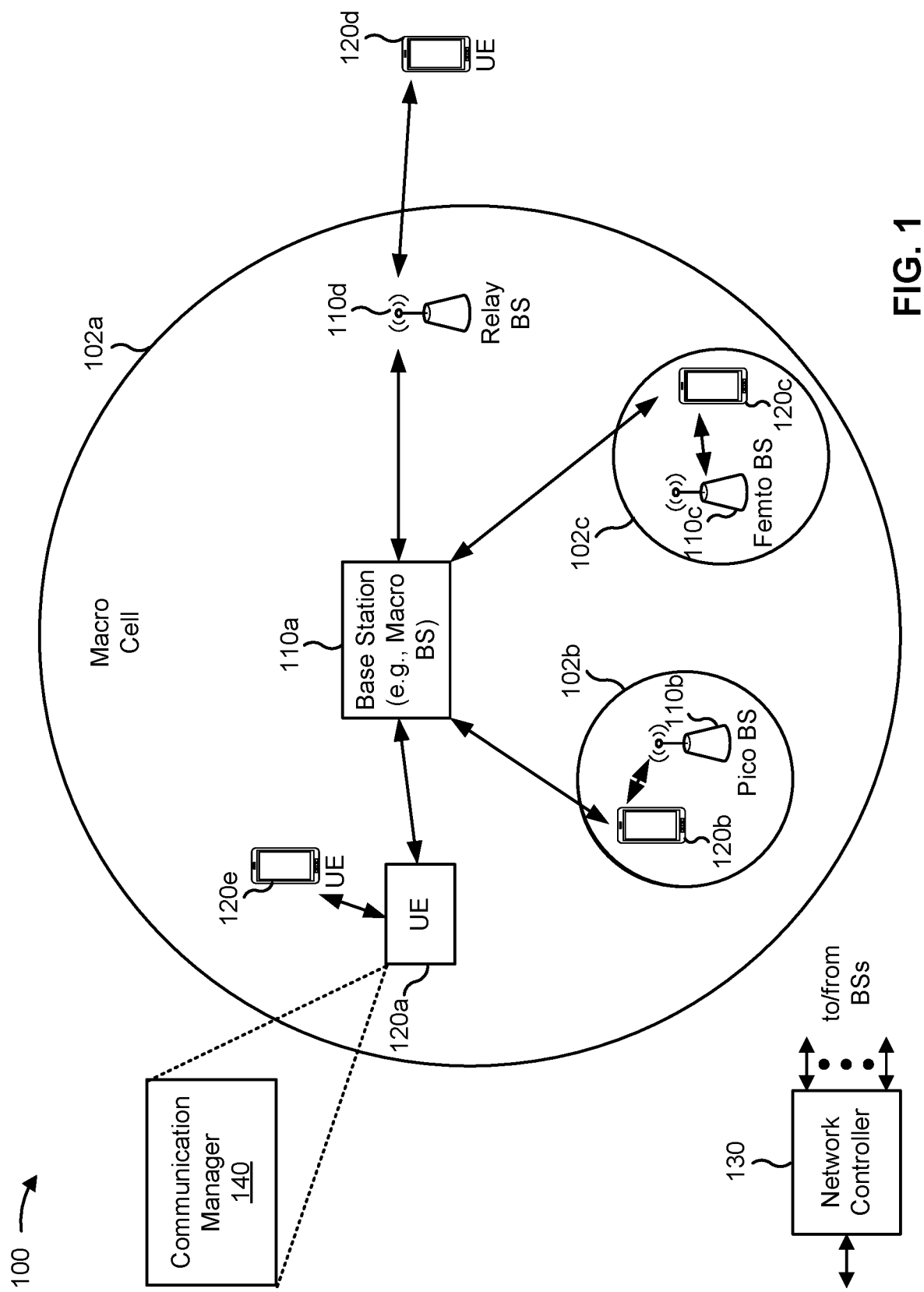
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU. DU and RU also can be implemented as virtual units. i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain an indication of a primary component carrier for a sidelink communication using carrier aggregation, and transmit the sidelink communication to a second UE using the primary component carrier. Additionally, or alternatively, the communication manager 140 may perform one or more other operations described herein.

As indicated above, FIG. 1 is provided as an example. Other examples may differ from what is described with regard to FIG. 1.

Figure 2:
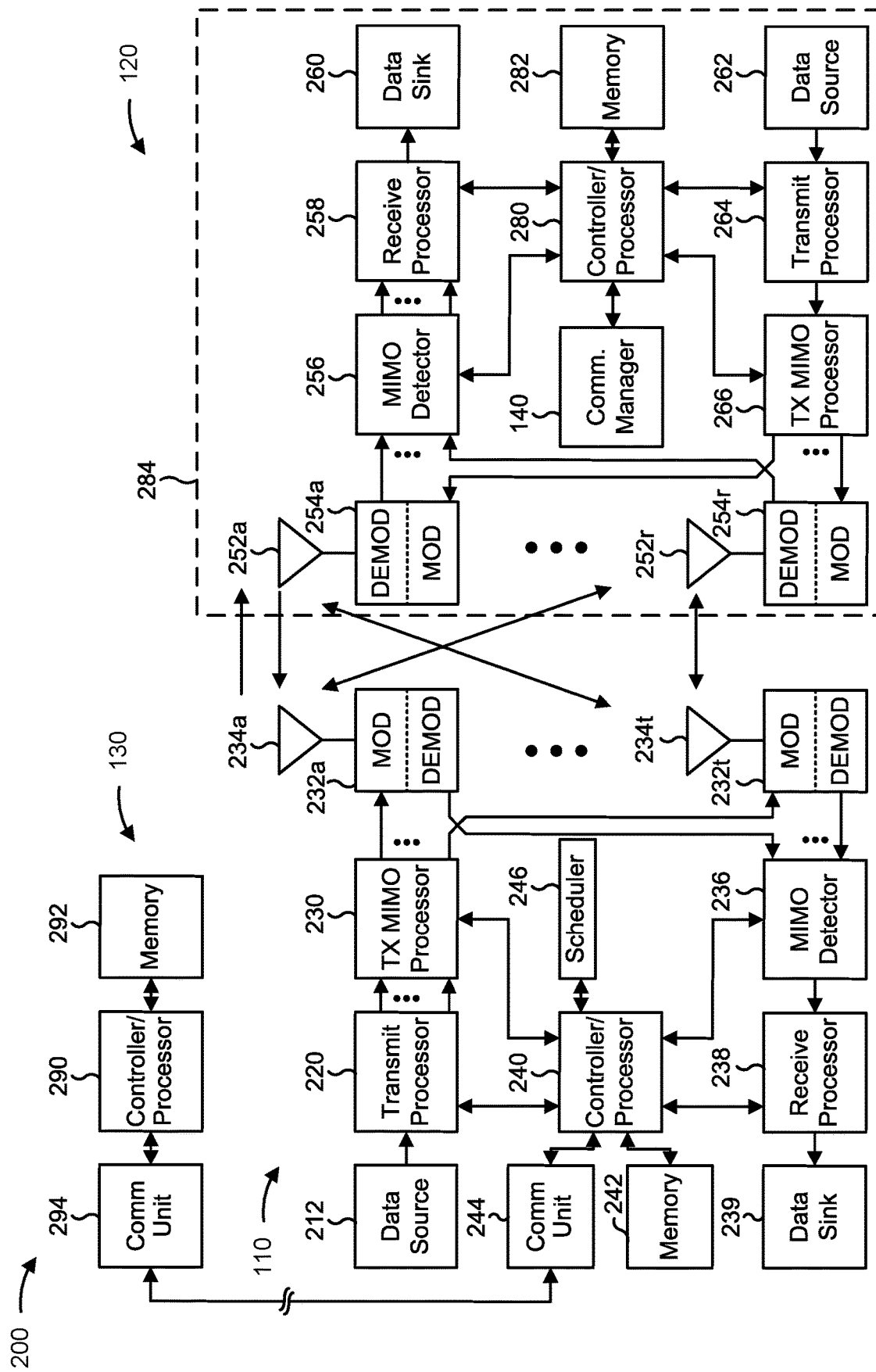
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-9).

The controller/processor 240 of the base station 110, the controller/processor 280 of the UE 120, and/or any other component(s) of FIG. 2 may perform one or more techniques associated with a sidelink primary component carrier for carrier aggregation, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, a first UE includes means for obtaining an indication of a primary component carrier for a sidelink communication using carrier aggregation; and/or means for transmitting the sidelink communication to a second UE using the primary component carrier. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
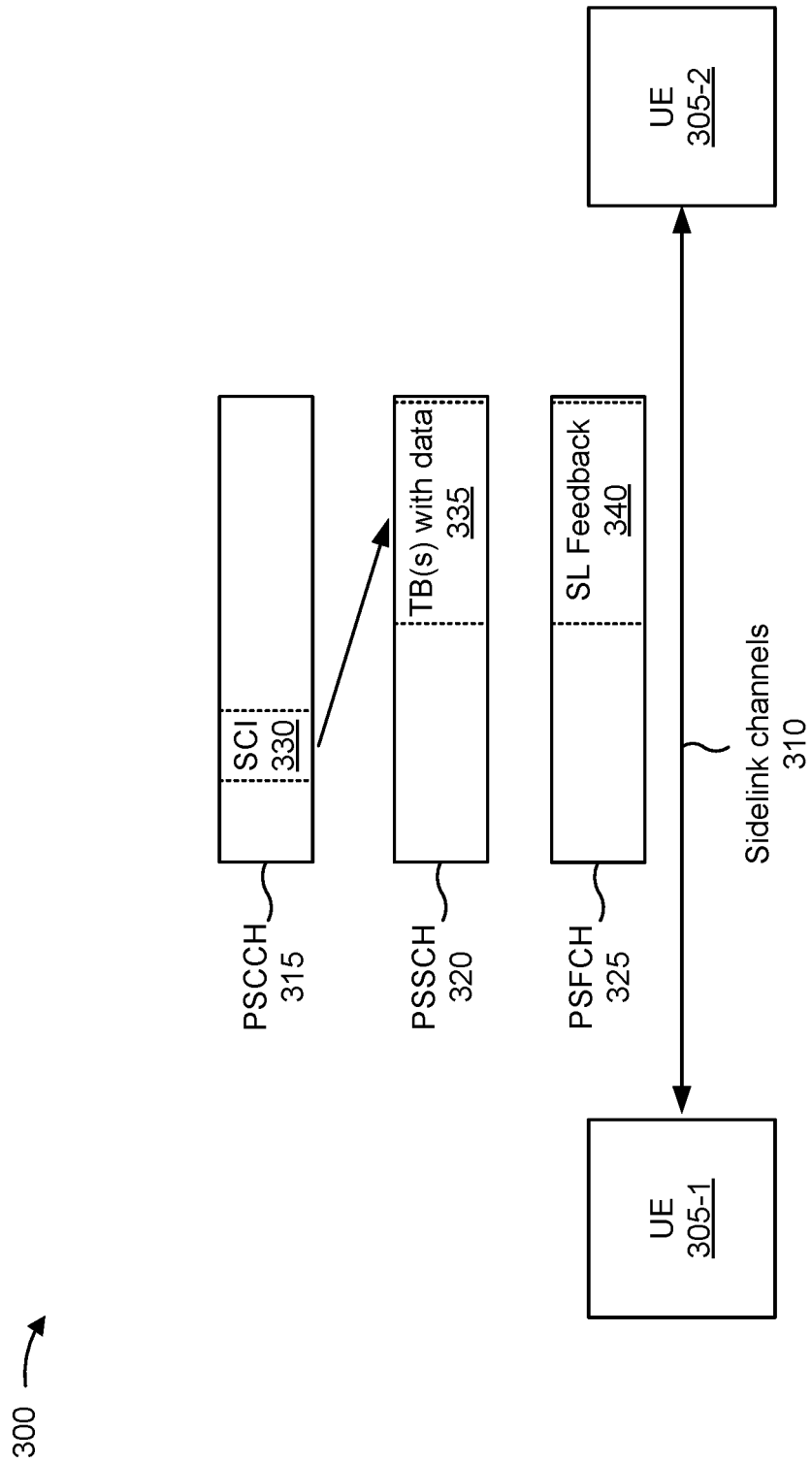
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing).

In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSSCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As described in more detail below, a UE, such as the UE 305-1, may obtain an indication of a primary component carrier for a sidelink communication, and may communicate with another UE, such as the UE 305-2, using the primary component carrier and the sidelink channels 310.

As indicated above, FIG. 3 is provided as an example. Other examples may differ from what is described with respect to FIG. 3.

Figure 4:
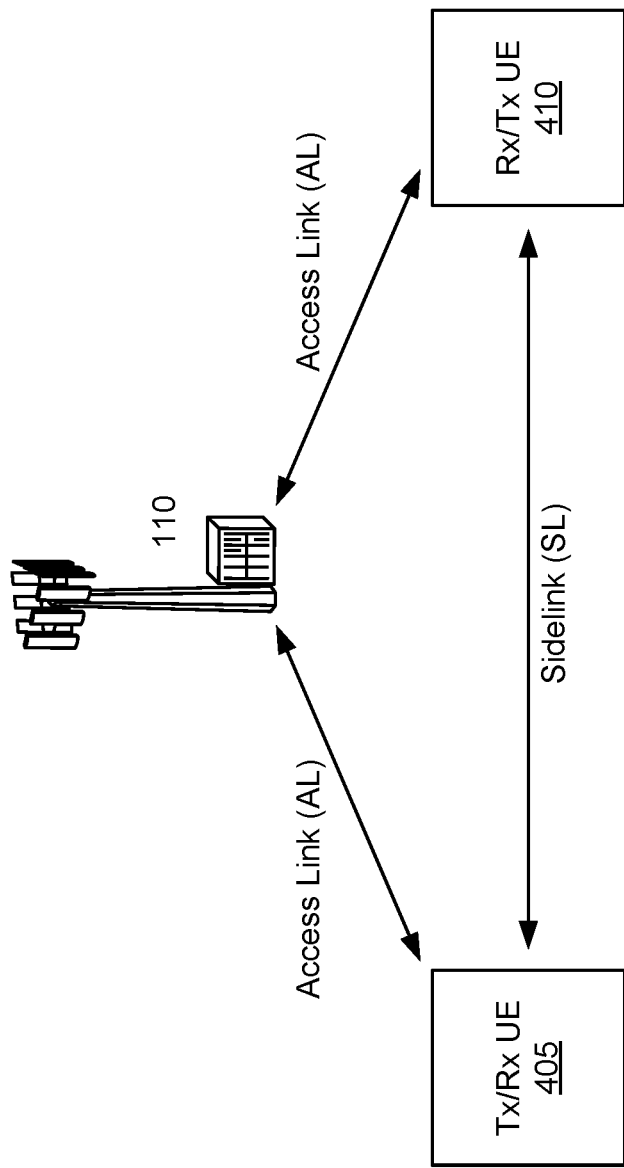
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As described in more detail below, a UE, such as the UE 405, may obtain an indication of a primary component carrier for a sidelink communication with another UE, such as the UE 410, and may communicate with the UE 410 via the primary component carrier.

As indicated above, FIG. 4 is provided as an example. Other examples may differ from what is described with respect to FIG. 4.

Figure 5:
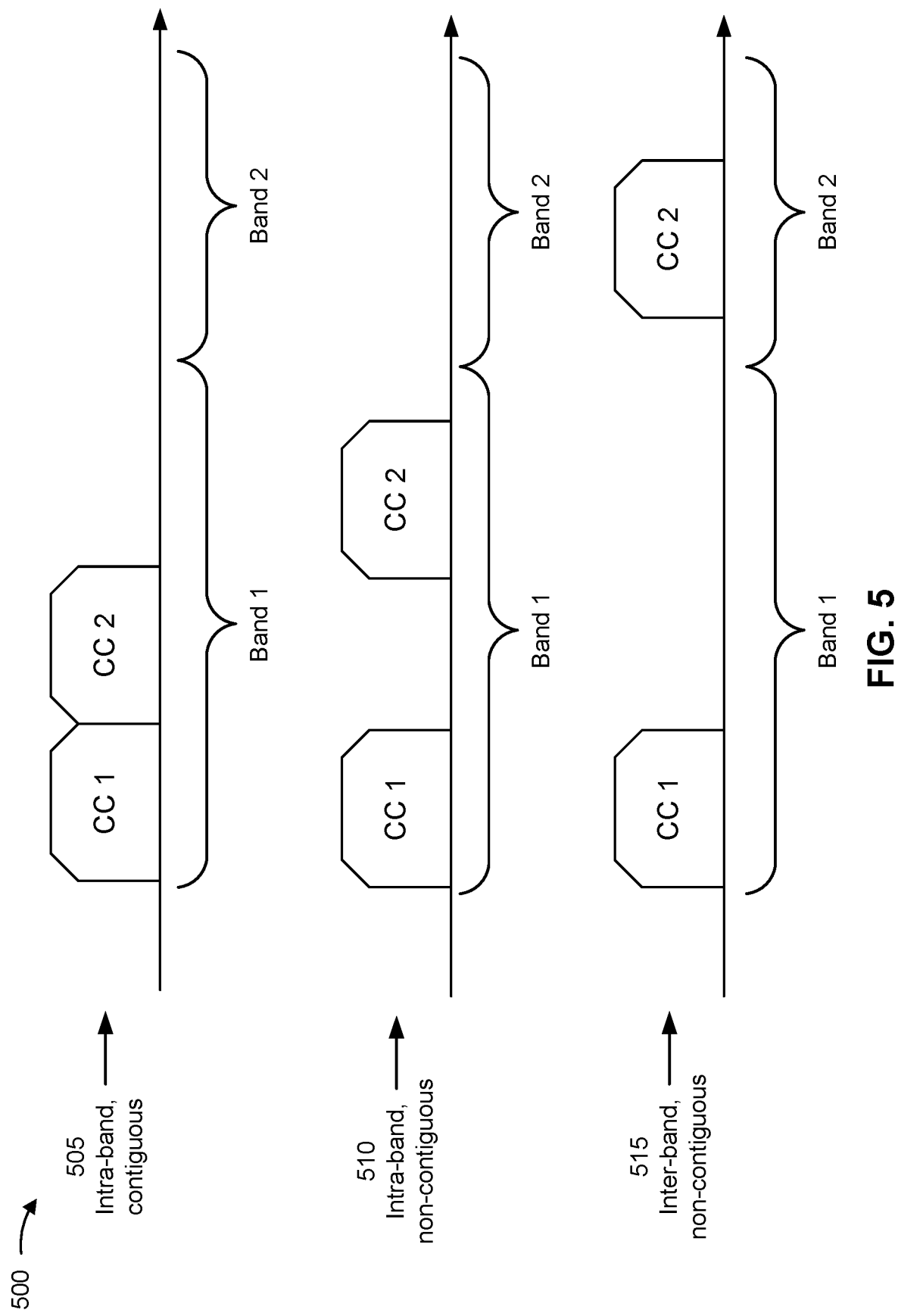
FIG. 5 is a diagram illustrating an example of carrier aggregation, in accordance with the present disclosure.

FIG. 5 is a diagram illustrating examples 500 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or another signaling message.

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some cases, the primary cell may include one or more features that are different than the features of the secondary cell. For example, secondary cells can be added, removed, activated, and/or de-activated. In contrast, adding, removing, activating, or de-activating a primary cell is a complex procedure that may require a handover. In some cases, radio link management may only be performed by the primary cell, even though a UE may perform measurements on the secondary cell. In some cases, only the primary cell (e.g., along with the PUCCH specific secondary cell) can carry PUCCH data. In some cases, radio access channel resources may only be carried on the primary cell. In some cases, secondary cells may be dormant, whereas primary cells may always be active.

As indicated above, FIG. 5 is provided as an example. Other examples may differ from what is described with regard to FIG. 5.

Figure 6:
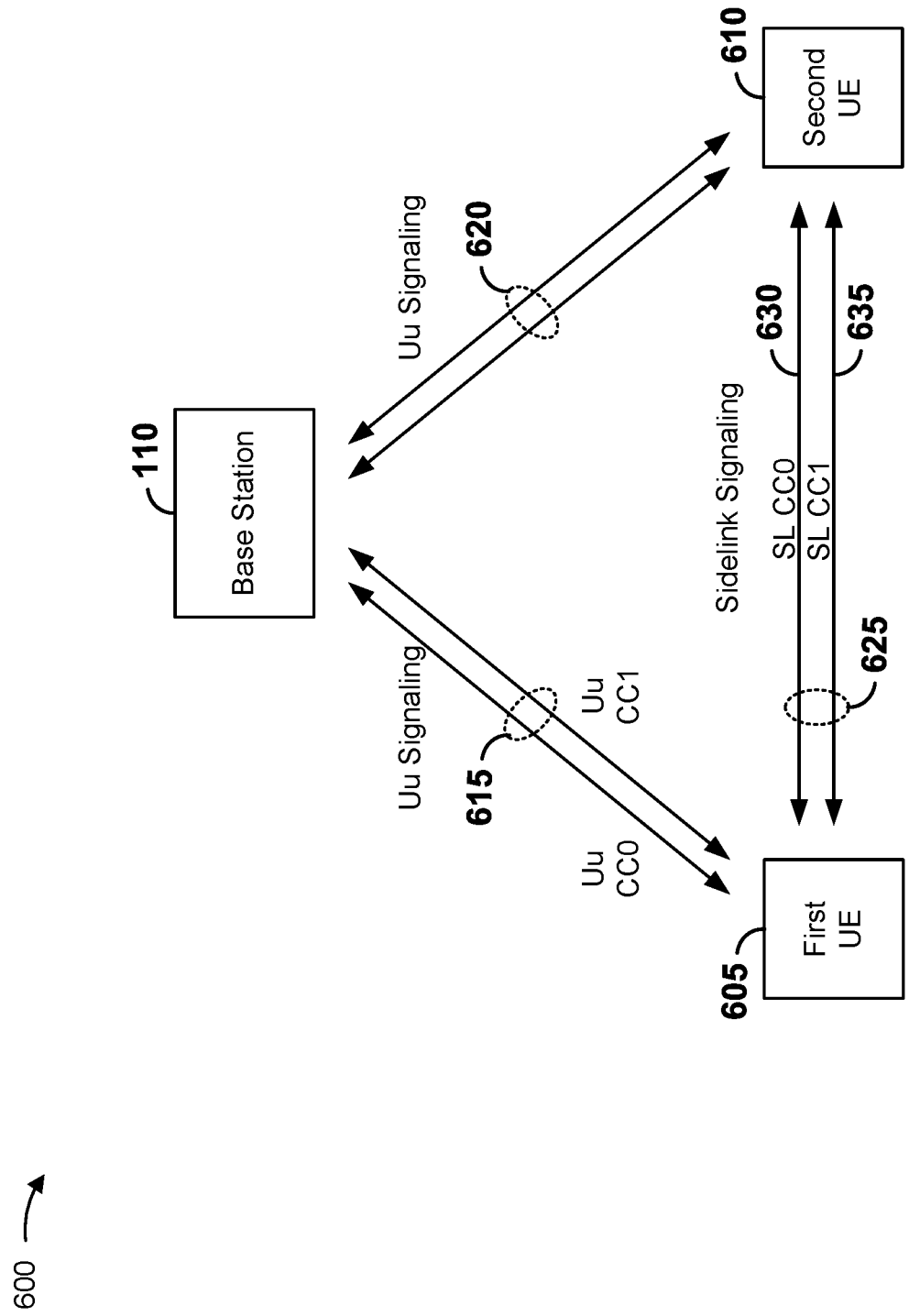
FIG. 6 is a diagram illustrating an example of component carrier grouping, in accordance with the present disclosure.

FIG. 6 is a diagram illustrating an example 600 of component carrier grouping, in accordance with the present disclosure. A first UE, such as the UE 605, may communicate with a base station, such as the base station 110. The first UE 605 may communicate with one or more other UEs, such as the second UE 610. The first UE 605 and/or the second UE 610 may include one or more features of the UE 120 described herein.

In some cases, the base station 110 may communicate with the first UE 605 and/or the second UE 610 via Uu signaling. The base station 110 may allocate at least one set of component carriers (CCs) for the first UE 605 and/or for the second UE 610. In the example of FIG. 6, the base station 110 may allocate a first set of CCs 615 for the first UE 605, and a second set of CCs 620 for the second UE 610. In accordance with this allocation, the base station 110 may define a set of resources for each CC. For example, a resource allocation by the base station 110 may specify a first frequency band for a first CC (Uu CC0) of the first set of CCs 615, and a second frequency band for a second CC (Uu CC1) of the first set of CCs 615. Thus, the first UE 605 may concurrently transmit data to (or receive data from) the base station 110 via the first CC and the second CC on the designated frequency bands.

In some cases, the first UE 605 and/or the second UE 610 may establish at least one set of CCs for sidelink communication. In the example of FIG. 6, the first UE 605 and/or the second UE 610 may establish a set of CCs 625 including a first sidelink CC 630 (SL CC0) and a second sidelink CC 635 (SL CC1). These sidelink CCs may operate on a subset of the resources defined for the first set of CCs 615 and/or the second set of CCs 620 for Uu signaling.

For Uu based communication, CCs may be grouped for different purposes. These groupings may be separate from the carrier aggregation and may depend upon different factors, such as signal propagation characteristics, power requirements, or bandwidth requirements, among other examples. For example, CC groups for Uu CCs may include timing advance groups (TAGs), beamforming groups, dormancy groups, HARQ feedback groups, discontinuous reception mode (DRX) groups, PUCCH groups, and multiple-packet scheduling groups, among other examples.

In some cases, in order to establish sidelink CC groups, the first UE 605 or the second UE 610 may map the sidelink CCs to corresponding Uu CCs, and may apply the Uu CC groupings to the corresponding mapped sidelink CCs to form the sidelink CC groups. In some cases, the network may configure a plurality of the Uu CCs as both Uu and sidelink CCs. In this example, each CC configured as both a Uu CC and sidelink CC may be grouped into sidelink CC groups based at least in part on the corresponding Uu CC groups. For example, a sidelink TAG may be formed that includes all of the sidelink CCs within a particular Uu TAG.

In this case, no additional configuration may be required. In some cases, depending on the sidelink resource pool allocated by the network, not all Uu CCs may be configured for both Uu and sidelink. Thus, the number of sidelink CCs in a particular sidelink CC group may be less than the number of Uu CCs in a corresponding Uu CC group. In addition, there may be more sidelink CCs configured than Uu CCs, and as a result, other sidelink CC groups may be formed from the additional sidelink CCs.

In some cases, the network may separately configure the Uu CCs and sidelink CCs, such that the center frequency and CC bandwidth may vary between the Uu CCs and sidelink CCs. In this example, the first UE 605 or the second UE 610 may map each sidelink CC to a corresponding Uu CC based at least in part on the corresponding center frequencies and CC bandwidths, and may apply the Uu CC groupings to the mapped sidelink CCs to form the sidelink CC groups. For example, a sidelink CC may have a center frequency and CC bandwidth that lies within a CC bandwidth of a Uu CC. In this case, the first UE 605 or the second UE 610 may map the sidelink CC to the Uu CC that contains the sidelink CC.

In some cases, the mapping of sidelink CCs to Uu CCs may be different for the different grouping types (e.g., for different purposes). For example, the first UE 605 or the second UE 610 may be configured based at least in part on standards or, for example, via RRC signaling, to map each sidelink CC to a corresponding Uu CC for each group type. As an example, a first sidelink CC (e.g., CC-A) may map to a first Uu CC (e.g., CC-1) to form a TAG, and to a second Uu CC (e.g., CC-2) to form a beamforming group. Other custom groupings of sidelink CCs may also be configured (e.g., pre-configured).

In some cases, a primary component carrier may be defined for a group of component carriers for use in sidelink communications. A component carrier group may include, for example, a timing advance group, a beamforming group, a dormancy group, a HARQ feedback group, a DRX group, a PUCCH group, or a multiple-packet scheduling group, among other examples. Each group of the component carrier groups may include a primary component carrier (e.g., for carrying control information for scheduling data communications on one or more secondary component carriers). However, the primary component carriers may not be the same across the groups of component carriers. For example, a first group of component carriers for performing a first function may use a first primary component carrier, and a second group of component carriers for performing a second function may use a second primary component carrier. Thus, multiple component carriers may be needed, resulting in complex data scheduling for sidelink communications.

Techniques and apparatuses are described herein for a sidelink primary component carrier for carrier aggregation. In some aspects, a first UE may obtain an indication of a primary component carrier for a sidelink communication using carrier aggregation. For example, the first UE may obtain information associated with a plurality of primary component carriers for a plurality of component carrier groups, and may determine that a primary component carrier, of the plurality of primary component carriers, is the primary component carrier for each of the plurality of component carrier groups. The first UE may determine to use the primary component carrier for one or more sidelink communications. Additionally, or alternatively, the first UE may receive a configuration that indicates to use the primary component carrier as the primary component carrier for the one or more sidelink communications. In some cases, the first UE may use the primary component carrier for all sidelink communications. In some cases, the first UE may use the primary component carrier for sidelink communications between the first UE and a second UE. In some cases, the first UE may use the primary component carrier for a portion of the sidelink communications between the first UE and the second UE (e.g., for communications from the first UE to the second UE), and may use another component carrier for another portion of the sidelink communications between the first UE and the second UE (e.g., communications from the second UE to the first UE).

As described above, each of a plurality of component carrier groups may include a primary component carrier. However, the primary component carriers may not be the same across the groups of component carriers. Thus, multiple component carriers may be needed, resulting in complex data scheduling for sidelink communications. The techniques and apparatuses described herein enable a UE to obtain a primary component carrier to be used across the groups of component carriers, resulting in less complex data scheduling, among other benefits.

As indicated above, FIG. 6 is provided as an example. Other examples may differ from what is described with regard to FIG. 6.

Figure 7:
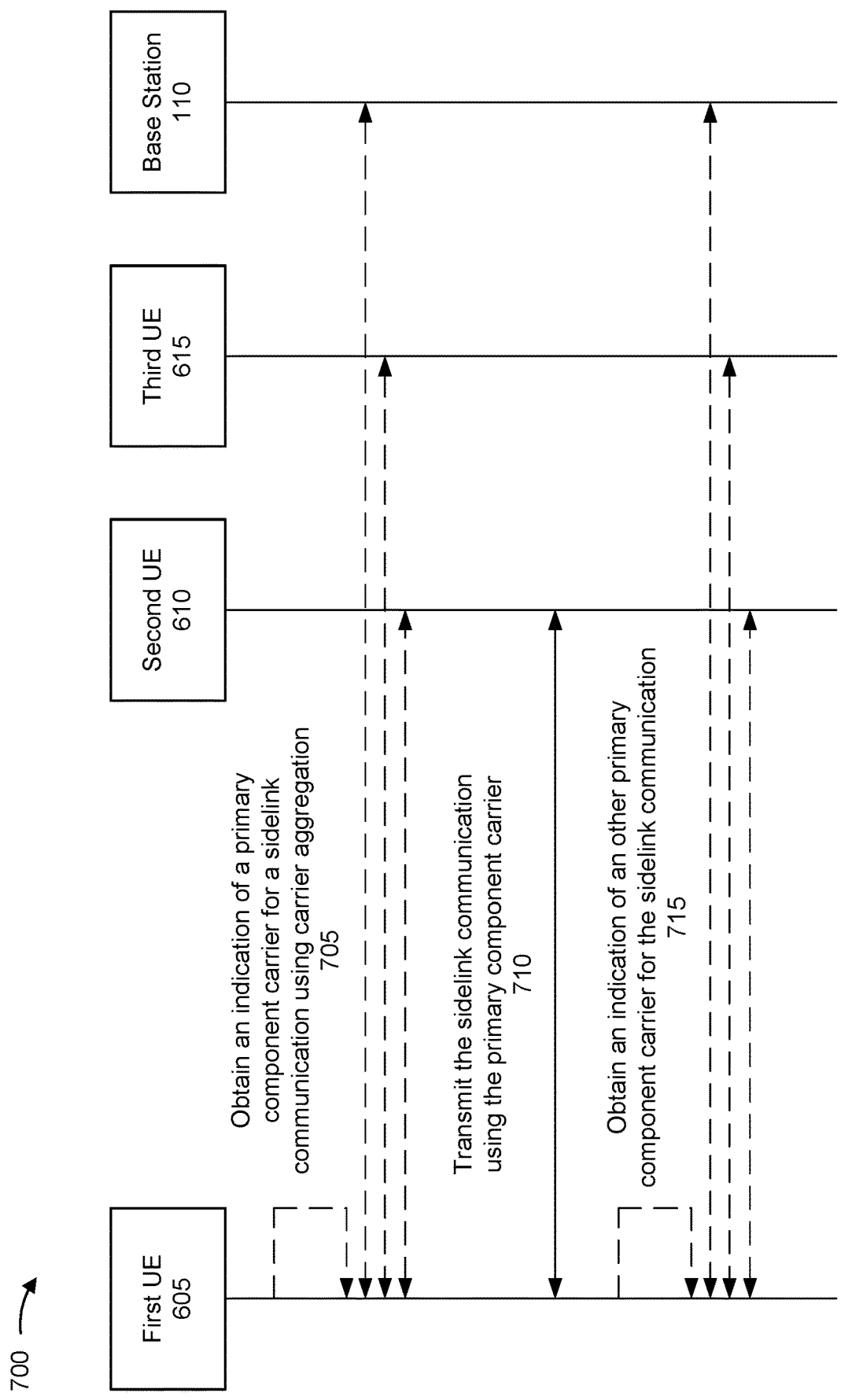
FIG. 7 is a diagram illustrating an example associated with a sidelink primary component carrier for carrier aggregation, in accordance with the present disclosure.

FIG. 7 is a diagram illustrating an example 700 associated with a sidelink primary component carrier for carrier aggregation, in accordance with the present disclosure. A first UE, such as the first UE 605, may communicate with a base station, such as the base station 110. The first UE 605 may communicate with one or more other UEs, such as the second UE 610 or the third UE 615, using one or more sidelink communications. The first UE 605, the second UE 610, and/or the third UE 615 may include some or all of the features of the UE 120.

As shown in connection with reference number 705, the first UE 605 may obtain an indication of a primary component carrier for a sidelink communication using carrier aggregation. As described above, carrier aggregation is a technology that enables two or more component carriers to be combined (e.g., into a single channel) to enhance data capacity. The primary component carrier may carry control information (e.g., DCI and/or scheduling information) for scheduling data communications on one or more secondary component carriers. As described herein, the term "obtain" may mean to receive, access, determine, or negotiate, among other examples. For example, obtaining the indication of the primary component carrier may include receiving the indication of the primary component carrier (e.g., from the base station 110 or the third UE 615), accessing the indication of the primary component carrier (e.g., from a memory of the first UE 605), determining the indication of the primary component carrier (e.g., from a plurality of component carriers or component carrier groups), or negotiating (e.g., with the second UE 610) to determine the indication of the primary component carrier.

In some aspects, the first UE 605 may obtain information associated with a plurality of primary component carriers for a plurality of component carrier groups, and may determine that a primary component carrier, of the plurality of primary component carriers, is a primary component carrier for each of the plurality of component carrier groups. For example, the first UE 605 may determine that a first set of component carriers, for performing a first function, uses the same primary component carrier as a second set of component carriers, for performing a second function. The first UE 605 may select the primary component carrier as the primary component carrier for one or more sidelink communications.

In some aspects, the first UE 605 may obtain a configuration that indicates to use the primary component carrier. For example, the first UE 605 may receive a configuration (e.g., from the base station 110 or the third UE 615) that indicates to use the primary component carrier as the primary component carrier for one or more sidelink communications.

In a first example, the indication of the primary component carrier may be an indication to use the primary component carrier for all sidelink communications. For example, the first UE 605 may obtain an indication to use the primary component carrier for all sidelink communications performed (e.g., transmitted or received) by the first UE 605. In this example, the first UE 605 may perform a negotiation to determine whether the primary component carrier can be used as the primary component carrier for a particular sidelink communication.

In some aspects, the first UE 605 may negotiate with the second UE 610 to determine whether the primary component carrier can be used for a sidelink communication with the second UE 610. In some aspects, the first UE 605 may negotiate with the base station 110 to determine whether the primary component carrier can be used for the sidelink communication. In some aspects, the first UE 605 may negotiate with another UE, such as the third UE 615, to determine whether the primary component carrier can be used for the sidelink communication. The third UE 615 may be an anchor UE (e.g., a relay UE).

In a second example, the indication of the component carrier may be an indication to use the primary component carrier for sidelink communications with the second UE 610. For example, the first UE 605 may obtain an indication to use the primary component carrier for all sidelink communications performed between the first UE 605 and the second UE 610.

In some aspects, the first UE 605 may obtain the indication of the primary component carrier based at least in part on a sidelink connection between the first UE 605 and the second UE 610. For example, the first UE 605 may receive the indication to use the primary component carrier, from the base station 110, or the third UE 615, after the sidelink connection has been established between the first UE 605 and the second UE 610.

In some aspects, the first UE 605 may negotiate with the second UE 610 to determine whether the primary component carrier can be used as the primary component carrier for the sidelink communication. For example, the first UE 605 may negotiate with the second UE 610, after the sidelink connection has been established between the first UE 605 and the second UE 610, to determine whether the primary component carrier can be used as the primary component carrier for the sidelink communication.

In some aspects, the indication of the primary component carrier may indicate to use the primary component carrier for a first type of communications with the second UE 610. The indication, or another indication, may indicate to use another primary component carrier for a second type of communications with the second UE 610. For example, the first UE 605 may obtain an indication to use the primary component carrier for unicast communications to the second UE 610, and to use another primary component carrier for groupcast communications to one or more UEs that include the second UE 610.

In some aspects, the first UE 605 and the second UE 610 may have one or more other sets of component carriers besides the primary component carrier. The first UE 605 may be configured to index a set of the component carriers differently than the second UE 610 indexes the set of component carriers. However, the first UE 605 and the second UE 610 may use common indexing or referencing for the primary component carrier.

In a third example, the indication of the primary component carrier may be an indication to use the primary component carrier for transmitting sidelink communications to the second UE 610. The indication, or another indication, may indicate to use another primary component carrier for receiving sidelink communications from the second UE 610. For example, the first UE 605 may obtain an indication to use a first primary component carrier for transmitting sidelink communications to the second UE 610, and an indication (e.g., the same indication or another indication) to use a second primary component carrier for receiving sidelink communications from the second UE 610.

In some aspects, the first UE 605 may receive the indication of the first primary component carrier and the second primary component carrier based at least in part on the sidelink connection between the first UE 605 and the second UE 610. For example, the first UE 605 may receive the indication of the first primary component carrier and the second primary component carrier, from the base station 110, or the third UE 615, after a sidelink connection has been established between the first UE 605 and the second UE 610.

In some aspects, the first UE 605 may negotiate with the second UE 610 to determine whether the first primary component carrier can be used as the primary component carrier for transmitting sidelink communications to the second UE 610, and whether the second primary component carrier can be used as the primary component carrier for receiving sidelink communications from the second UE 610. For example, the first UE 605 may negotiate with the second UE 610, after the sidelink connection has been established between the first UE 605 and the second UE 610, to determine whether the first primary component carrier can be used as the primary component carrier for transmitting sidelink communications to the second UE 610, and whether the second primary component carrier can be used as the primary component carrier for receiving sidelink communications from the second UE 610.

In some aspects, the primary component carrier may be configured with one or more beam failure detection reference signals. In the case of bidirectional beam failure recovery, the beam failure detection reference signals from the first UE 605 to the second UE 610 may be communicated using the first primary component carrier, and the beam failure detection reference signals from the second UE 610 to the first UE 605 may be communicated using the second primary component carrier.

In some aspects, the primary component carrier may be configured to carry (e.g., transport) PSFCH signaling. For example, the first primary component carrier may be configured to carry PSFCH signaling from the second UE 610 to the first UE 605, and the second primary component carrier may be configured to carry PSFCH signaling from the first UE 605 to the second UE 610.

As described above, the first UE 605 may be configured to obtain (e.g., determine) the indication of the primary component carrier based at least in part on a plurality of primary component carriers for a plurality of component carrier groups. Additionally, or alternatively, the first UE 605 may obtain (e.g., receive) the indication of the primary component carrier from the second UE 610, the third UE 615, or the base station 110. Obtaining the indication of the primary component carrier may include obtaining an indication of a primary component carrier to be used for all sidelink communications, obtaining an indication of a primary component carrier to be used for sidelink communications with the second UE 610, or obtaining an indication of a first primary component carrier to be used for transmitting sidelink communications to the second UE 610 and a second primary component carrier to be used for receiving sidelink communications from the second UE 610.

As shown in connection with reference number 710, the first UE 605 may transmit, and the second UE 610 may receive, the sidelink communication using the primary component carrier. For example, the first UE 605 may communicate (e.g., transmit or receive) control information using the primary component carrier for scheduling one or more data communications.

In some aspects, the first UE 605 and the second UE 610 may establish a sidelink connection. In the first example described above in connection with reference number 705, the first UE 605 may be configured to communicate (e.g., negotiate) with the second UE 610, after the sidelink connection has been established, to determine whether the primary component carrier can be used for the sidelink communication. In this case, the second UE 610 may not be configured with the indication of the primary component carrier prior to the sidelink connection. In the second example and the third example described above in connection with reference number 705, the first UE 605 may be configured to communicate (e.g., negotiate) with the second UE 610 to determine whether the primary component carrier(s) can be used for the sidelink communication. In this case, the second UE 610 may be configured with the indication of the primary component carrier(s) prior to the sidelink connection.

As shown in connection with reference number 715, the first UE 605 may obtain an indication to use another primary component carrier (e.g., an "updated" primary component carrier) for the sidelink communication. The indication to use the updated primary component carrier for the sidelink communication may be received as part of a configuration (e.g., a reconfiguration).

In some aspects, the first UE 605 may receive the configuration that indicates to use the updated primary component carrier from the base station 110. In some aspects, the first UE 605 may receive the configuration that indicates to use the updated primary component carrier from an anchor UE, such as the third UE 615.

In the first example described above in connection with reference number 705, the configuration may be based at least in part on one or more sidelink connections that were established after the configuration for the primary component carrier (e.g., the "previous" primary component carrier). For example, the first UE 605 may establish one or more new sidelink connections, and the previous primary component carrier may not be able to serve as the primary component carrier for those new sidelink connections. Thus, the first UE 605 may be configured with the updated primary component carrier that is capable of serving as the primary component carrier for the new sidelink connections. In some aspects, the first UE 605 may not be in communication (e.g., may be out of coverage) with the base station 110. In this case, the updated primary component carrier may be included as part of a pre-configuration (e.g., an initial configuration) of the first UE 605, or may be derived based at least in part on a primary component carrier of another UE (e.g., the SynchRef UE).

In the second example and the third example described above in connection with reference number 705, the updated primary component carrier may be the component carrier that was used for the discovery procedure, or the initial beam pairing procedure, for establishing the sidelink connection between the first UE 605 and the second UE 610. In some aspects, the first UE 605 may be configured with a class of UEs for which the primary component carrier can be used. The first UE 605 may use the primary component carrier for sidelink communications with the second UE 610 based at least in part on determining that the second UE 610 is in the class of UEs for which the primary component carrier can be used.

In some aspects, the first UE 605 may perform one or more negotiations to obtain the configuration (e.g., the reconfiguration). For example, the first UE 605 may negotiate with the second UE 610 to determine the updated primary component carrier for sidelink communications with the second UE 610. In some aspects, the first UE 605 and the second UE 610 may negotiate to determine a single updated primary component carrier for all sidelink communications between the first UE 605 and the second UE 610. In some aspects, the negotiation may be used to determine a first updated primary component carrier for transmitting sidelink communications from the first UE 605 to the second UE 610, and to determine a second updated primary component carrier for transmitting sidelink communications from the second UE 610 to the first UE 605.

In some aspects, the first UE 605 may obtain the updated primary component carrier based at least in part on a combination of the configuration and the negotiation procedures. For example, the base station 110, or the third UE 615, may configure a set of component carriers in the first UE 615 that may be used as primary component carriers for sidelink communications. The first UE 605 may negotiate with the second UE 610 to select a primary component carrier, from the set of component carriers, to be used as the primary component carrier for sidelink communications between the first UE 605 and the second UE 610.

As described above, each of a plurality of component carrier groups may include a primary component carrier. However, the primary component carriers may not be the same across the groups of component carriers. Thus, multiple component carriers may be needed, resulting in complex data scheduling for sidelink communications. The techniques and apparatuses described herein enable the first UE to obtain a primary component carrier to be used across the groups of component carriers, resulting in less complex data scheduling, among other benefits.

As indicated above, FIG. 7 is provided as an example. Other examples may differ from what is described with regard to FIG. 7.

Figure 8:
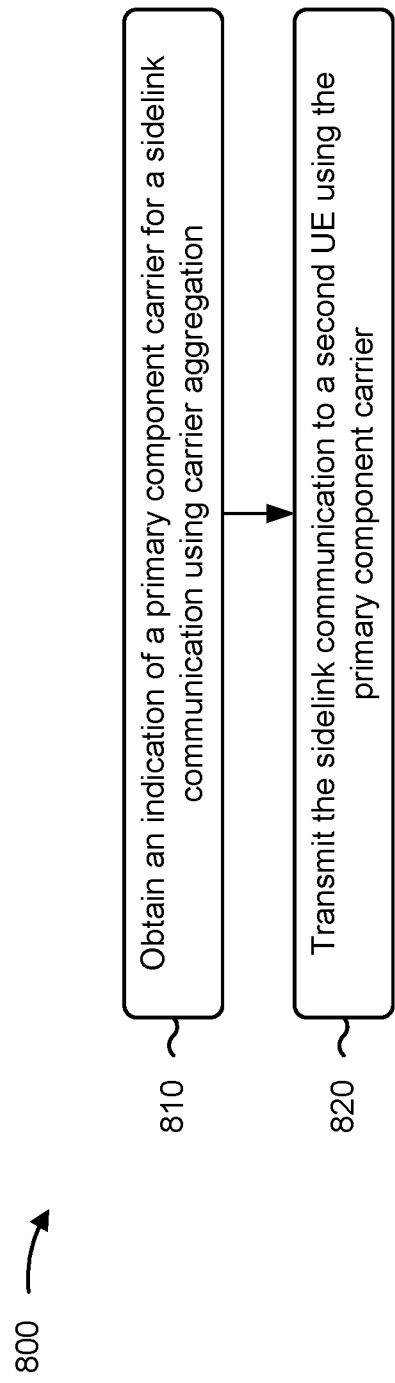
FIG. 8 is a diagram illustrating an example process associated with a sidelink primary component carrier for carrier aggregation, in accordance with the present disclosure.

FIG. 8 is a diagram illustrating an example process 800 performed, for example, by a first UE, in accordance with the present disclosure. Example process 800 is an example where the first UE (e.g., first UE 605) performs operations associated with a sidelink primary component carrier for carrier aggregation.

As shown in FIG. 8, in some aspects, process 800 may include obtaining an indication of a primary component carrier for a sidelink communication using carrier aggregation (block 810). For example, the first UE (e.g., using communication manager 140 and/or obtaining component 908, depicted in FIG. 9) may obtain an indication of a primary component carrier for a sidelink communication using carrier aggregation, as described above.

As further shown in FIG. 8, in some aspects, process 800 may include transmitting the sidelink communication to a second UE using the primary component carrier (block 820). For example, the first UE (e.g., using communication manager 140 and/or transmission component 904, depicted in FIG. 9) may transmit the sidelink communication to a second UE using the primary component carrier, as described above.

Process 800 may include additional aspects, such as any single aspect or any combination of aspects described below and/or in connection with one or more other processes described elsewhere herein.

In a first aspect, process 800 includes obtaining information associated with a plurality of primary component carriers for a plurality of component carrier groups.

In a second aspect, alone or in combination with the first aspect, obtaining the indication of the primary component carrier comprises obtaining an indication that a primary component carrier, of the plurality of primary component carriers, is a primary component carrier for each of the plurality of component carrier groups.

In a third aspect, alone or in combination with one or more of the first and second aspects, obtaining the indication of the primary component carrier comprises receiving a configuration that indicates to use the primary component carrier as the primary component carrier for the sidelink communication.

In a fourth aspect, alone or in combination with one or more of the first through third aspects, the indication of the primary component carrier is an indication to use the primary component carrier for all sidelink communications.

In a fifth aspect, alone or in combination with one or more of the first through fourth aspects, process 800 includes performing a negotiation to determine whether the primary component carrier can be used as the primary component carrier for the sidelink communication.

In a sixth aspect, alone or in combination with one or more of the first through fifth aspects, performing the negotiation comprises negotiating with the second UE, negotiating with a base station, or negotiating with a third UE.

In a seventh aspect, alone or in combination with one or more of the first through sixth aspects, the indication of the primary component carrier is an indication to use the primary component carrier for sidelink communications with the second UE.

In an eighth aspect, alone or in combination with one or more of the first through seventh aspects, the indication of the primary component carrier is obtained based at least in part on a sidelink connection between the first UE and the second UE.

In a ninth aspect, alone or in combination with one or more of the first through eighth aspects, obtaining the indication of the primary component carrier comprises receiving the indication of the primary component carrier, from a base station or a third UE, based at least in part on the sidelink connection between the first UE and the second UE.

In a tenth aspect, alone or in combination with one or more of the first through ninth aspects, obtaining the indication of the primary component carrier comprises negotiating with the second UE, based at least in part on the sidelink connection between the first UE and the second UE, to determine whether the primary component carrier can be used as the primary component carrier for the sidelink communication.

In an eleventh aspect, alone or in combination with one or more of the first through tenth aspects, the indication indicates to use the primary component carrier for a first type of communications with the second UE, and to use an other primary component carrier for a second type of communications with the second UE.

In a twelfth aspect, alone or in combination with one or more of the first through eleventh aspects, the first type of communications includes unicast communications, and the second type of communications includes groupcast communications.

In a thirteenth aspect, alone or in combination with one or more of the first through twelfth aspects, the indication of the primary component carrier indicates to use the primary component carrier for transmitting sidelink communications to the second UE, and to use an other primary component carrier for receiving sidelink communications from the second UE.

In a fourteenth aspect, alone or in combination with one or more of the first through thirteenth aspects, the indication of the primary component carrier and the other primary component carrier is obtained based at least in part on a sidelink connection between the first UE and the second UE.

In a fifteenth aspect, alone or in combination with one or more of the first through fourteenth aspects, obtaining the indication of the primary component carrier comprises receiving the indication of the primary component carrier and the other primary component carrier, from a base station or a third UE, based at least in part on the sidelink connection between the first UE and the second UE.

In a sixteenth aspect, alone or in combination with one or more of the first through fifteenth aspects, obtaining the indication of the primary component carrier comprises negotiating with the second UE, based at least in part on the sidelink connection between the first UE and the second UE, to determine whether the primary component carrier can be used for transmitting the sidelink communication and the other primary component carrier can be used for receiving the sidelink communication.

In a seventeenth aspect, alone or in combination with one or more of the first through sixteenth aspects, process 800 includes obtaining an indication to use an other primary component carrier for the sidelink communication.

In an eighteenth aspect, alone or in combination with one or more of the first through seventeenth aspects, the indication to use the other primary component carrier is received from a base station or a third UE.

In a nineteenth aspect, alone or in combination with one or more of the first through eighteenth aspects, the indication to use the other primary component carrier is based at least in part on a connection between the first UE and a third UE.

In a twentieth aspect, alone or in combination with one or more of the first through nineteenth aspects, process 800 includes performing beam discovery or beam pairing, using the other primary component carrier, prior to receiving the indication to use the other primary component carrier for the sidelink communication.

In a twenty-first aspect, alone or in combination with one or more of the first through twentieth aspects, the indication to use the other primary component carrier is obtained based at least in part on a negotiation between the first UE and the second UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
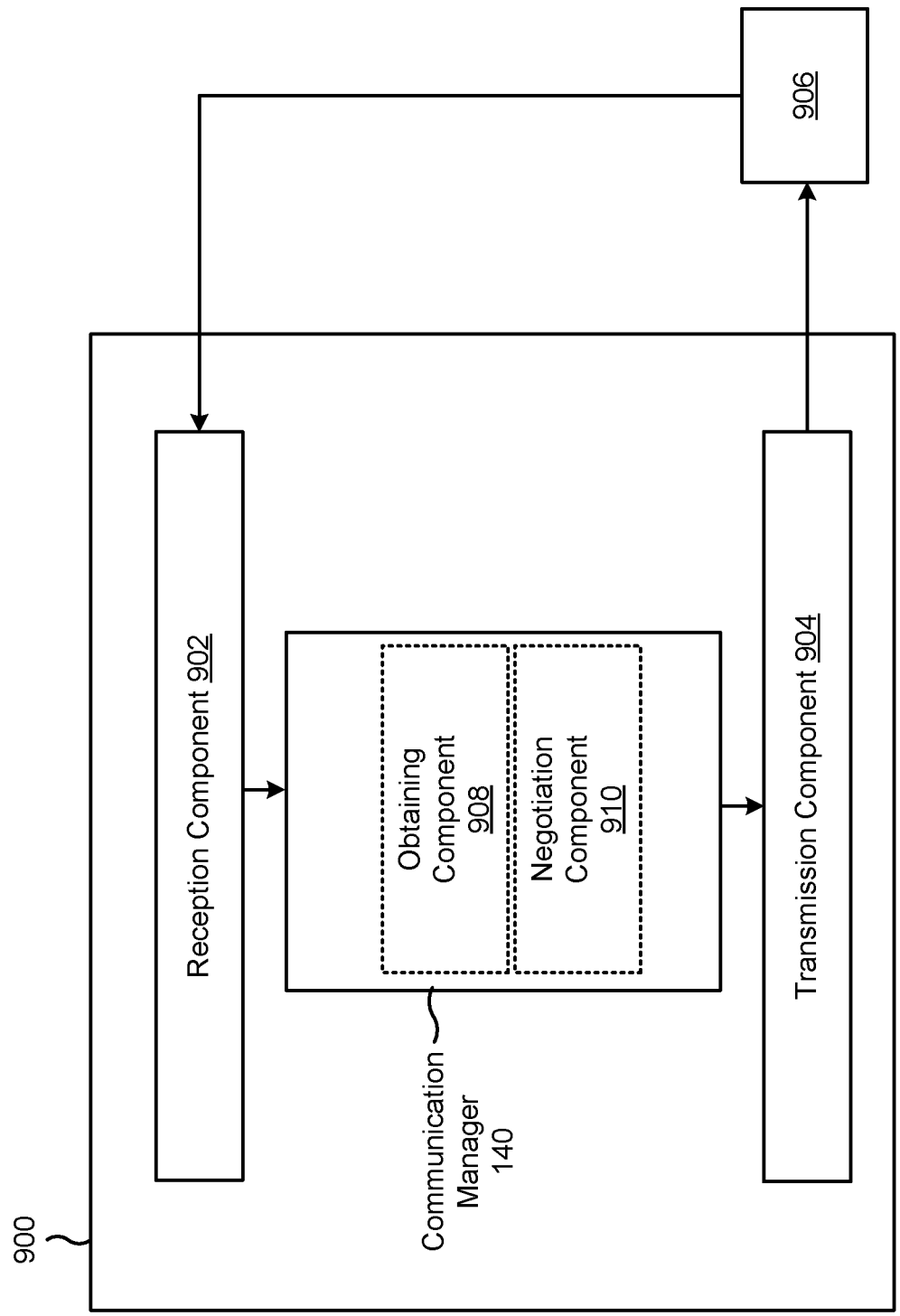
FIG. 9 is a diagram of an example apparatus for wireless communication, in accordance with the present disclosure.

FIG. 9 is a diagram of an example apparatus 900 for wireless communication. The apparatus 900 may be a first UE, or a first UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an obtaining component 908, or a negotiation component 910, among other examples.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the first UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the first UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the first UE described in connection with FIG. 2. In some aspects, the transmission component 904 may be co-located with the reception component 902 in a transceiver.

The obtaining component 908 may obtain an indication of a primary component carrier for a sidelink communication using carrier aggregation. The transmission component 904 may transmit the sidelink communication to a second UE using the primary component carrier.

The obtaining component 908 may obtain information associated with a plurality of primary component carriers for a plurality of component carrier groups.

The negotiation component 910 may perform a negotiation to determine whether the primary component carrier can be used as the primary component carrier for the sidelink communication.

The obtaining component 908 may obtain an indication to use an other primary component carrier for the sidelink communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first user equipment (UE), comprising: obtaining an indication of a primary component carrier for a sidelink communication using carrier aggregation; and transmitting the sidelink communication to a second UE using the primary component carrier.

Aspect 2: The method of Aspect 1, further comprising obtaining information associated with a plurality of primary component carriers for a plurality of component carrier groups.

Aspect 3: The method of Aspect 2, wherein obtaining the indication of the primary component carrier comprises obtaining an indication that a primary component carrier, of the plurality of primary component carriers, is a primary component carrier for each of the plurality of component carrier groups.

Aspect 4: The method of any of Aspects 1-3, wherein obtaining the indication of the primary component carrier comprises receiving a configuration that indicates to use the primary component carrier as the primary component carrier for the sidelink communication.

Aspect 5: The method of any of Aspects 1-4, wherein the indication of the primary component carrier is an indication to use the primary component carrier for all sidelink communications.

Aspect 6: The method of Aspect 5, further comprising performing a negotiation to determine whether the primary component carrier can be used as the primary component carrier for the sidelink communication.

Aspect 7: The method of Aspect 6, wherein performing the negotiation comprises negotiating with the second UE, negotiating with a base station, or negotiating with a third UE.

Aspect 8: The method of any of Aspects 1-7, wherein the indication of the primary component carrier is an indication to use the primary component carrier for sidelink communications with the second UE.

Aspect 9: The method of Aspect 8, wherein the indication of the primary component carrier is obtained based at least in part on a sidelink connection between the first UE and the second UE.

Aspect 10: The method of Aspect 9, wherein obtaining the indication of the primary component carrier comprises receiving the indication of the primary component carrier, from a base station or a third UE, based at least in part on the sidelink connection between the first UE and the second UE.

Aspect 11: The method of Aspect 9, wherein obtaining the indication of the primary component carrier comprises negotiating with the second UE, based at least in part on the sidelink connection between the first UE and the second UE, to determine whether the primary component carrier can be used as the primary component carrier for the sidelink communication.

Aspect 12: The method of Aspect 8, wherein the indication indicates to use the primary component carrier for a first type of communications with the second UE, and to use an other primary component carrier for a second type of communications with the second UE.

Aspect 13: The method of Aspect 12, wherein the first type of communications includes unicast communications, and the second type of communications includes groupcast communications.

Aspect 14: The method of any of Aspects 1-13, wherein the indication of the primary component carrier indicates to use the primary component carrier for transmitting sidelink communications to the second UE, and to use an other primary component carrier for receiving sidelink communications from the second UE.

Aspect 15: The method of Aspect 14, wherein the indication of the primary component carrier and the other primary component carrier is obtained based at least in part on a sidelink connection between the first UE and the second UE.

Aspect 16: The method of Aspect 15, wherein obtaining the indication of the primary component carrier comprises receiving the indication of the primary component carrier and the other primary component carrier, from a base station or a third UE, based at least in part on the sidelink connection between the first UE and the second UE.

Aspect 17: The method of Aspect 15, wherein obtaining the indication of the primary component carrier comprises negotiating with the second UE, based at least in part on the sidelink connection between the first UE and the second UE, to determine whether the primary component carrier can be used for transmitting the sidelink communication and the other primary component carrier can be used for receiving the sidelink communication.

Aspect 18: The method of any of Aspects 1-17, further comprising obtaining an indication to use an other primary component carrier for the sidelink communication.

Aspect 19: The method of Aspect 18, wherein the indication to use the other primary component carrier is received from a base station or a third UE.

Aspect 20: The method of Aspect 18, wherein the indication to use the other primary component carrier is based at least in part on a connection between the first UE and a third UE.

Aspect 21: The method of Aspect 18, further comprising performing beam discovery or beam pairing, using the other primary component carrier, prior to receiving the indication to use the other primary component carrier for the sidelink communication.

Aspect 22: The method of Aspect 18, wherein the indication to use the other primary component carrier is obtained based at least in part on a negotiation between the first UE and the second UE.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
one or more memories; and
one or more processors, coupled to the one or more memories, configured to:
receive, from a second UE, a third UE, or a base station, and in accordance with a sidelink connection between the first UE and the second UE, an indication of a primary component carrier for a sidelink communication using carrier aggregation; and
transmit the sidelink communication to the second UE using the primary component carrier.

2. The apparatus of claim 1, wherein the one or more processors are configured to obtain information associated with a plurality of primary component carriers for a plurality of component carrier groups.

3. The apparatus of claim 2, wherein the one or more processors, to receive the indication of the primary component carrier, are configured to receive an indication that a primary component carrier, of the plurality of primary component carriers, is a primary component carrier for each of the plurality of component carrier groups.

4. The apparatus of claim 1, wherein the one or more processors, to receive the indication of the primary component carrier, are configured to receive a configuration that indicates to use the primary component carrier as the primary component carrier for the sidelink communication.

5. The apparatus of claim 1, wherein the indication of the primary component carrier is an indication to use the primary component carrier for all sidelink communications.

6. The apparatus of claim 5, wherein the one or more processors are further configured to perform a negotiation to determine whether the primary component carrier can be used as the primary component carrier for the sidelink communication.

7. The apparatus of claim 6, wherein the one or more processors, to perform the negotiation, are configured to negotiate with the second UE, negotiate with the base station, or negotiate with the third UE.

8. The apparatus of claim 1, wherein the indication of the primary component carrier is an indication to use the primary component carrier for sidelink communications with the second UE.

9. The apparatus of claim 8, wherein the one or more processors, to receive the indication of the primary component carrier, are configured to negotiate with the second UE, based at least in part on the sidelink connection between the first UE and the second UE, to determine whether the primary component carrier can be used as the primary component carrier for the sidelink communication.

10. The apparatus of claim 8, wherein the indication indicates to use the primary component carrier for a first type of communications with the second UE, and to use an other primary component carrier for a second type of communications with the second UE.

11. The apparatus of claim 10, wherein the first type of communications includes unicast communications, and the second type of communications includes groupcast communications.

12. The apparatus of claim 1, wherein the indication of the primary component carrier indicates to use the primary component carrier for transmitting sidelink communications to the second UE, and to use an other primary component carrier for receiving sidelink communications from the second UE.

13. The apparatus of claim 12, wherein the one or more processors, to receive the indication of the primary component carrier, are configured to negotiate with the second UE, based at least in part on the sidelink connection between the first UE and the second UE, to determine whether the primary component carrier can be used for transmitting the sidelink communication and the other primary component carrier can be used for receiving the sidelink communication.

14. The apparatus of claim 1, wherein the one or more processors are further configured to obtain an indication to use an other primary component carrier for the sidelink communication.

15. The apparatus of claim 14, wherein the indication to use the other primary component carrier is received from the base station or the third UE.

16. The apparatus of claim 14, wherein the indication to use the other primary component carrier is received after a connection between the first UE and the third UE.

17. The apparatus of claim 14, wherein the one or more processors are further configured to perform beam discovery or beam pairing, using the other primary component carrier, prior to receiving the indication to use the other primary component carrier for the sidelink communication.

18. The apparatus of claim 14, wherein the indication to use the other primary component carrier is received based at least in part on a negotiation between the first UE and the second UE.

19. A method of wireless communication performed by a first user equipment (UE), comprising:
receiving, from a second UE, a third UE, or a base station, and in accordance with a sidelink connection between the first UE and the second UE, an indication of a primary component carrier for a sidelink communication using carrier aggregation; and
transmitting the sidelink communication to the second UE using the primary component carrier.

20. The method of claim 19, further comprising obtaining information associated with a plurality of primary component carriers for a plurality of component carrier groups.

21. The method of claim 20, wherein receiving the indication of the primary component carrier comprises receiving an indication that a primary component carrier, of the plurality of primary component carriers, is a primary component carrier for each of the plurality of component carrier groups.

22. The method of claim 19, wherein receiving the indication of the primary component carrier comprises receiving a configuration that indicates to use the primary component carrier as the primary component carrier for the sidelink communication.

23. The method of claim 19, wherein the indication of the primary component carrier is an indication to use the primary component carrier for all sidelink communications.

24. The method of claim 19, wherein the indication of the primary component carrier is an indication to use the primary component carrier for sidelink communications with the second UE.

25. The method of claim 19, wherein the indication of the primary component carrier indicates to use the primary component carrier for transmitting sidelink communications to the second UE, and to use an other primary component carrier for receiving sidelink communications from the second UE.

26. The method of claim 19, further comprising obtaining an indication to use an other primary component carrier for the sidelink communication.

27. The method of claim 23, further comprising performing a negotiation to determine whether the primary component carrier can be used as the primary component carrier for the sidelink communication.

28. The method of claim 24, wherein receiving the indication of the primary component carrier comprises negotiating with the second UE, based at least in part on the sidelink connection between the first UE and the second UE, to determine whether the primary component carrier can be used as the primary component carrier for the sidelink communication.

29. The method of claim 24, wherein the indication indicates to use the primary component carrier for a first type of communications with the second UE, and to use an other primary component carrier for a second type of communications with the second UE.

30. The method of claim 25, wherein receiving the indication of the primary component carrier comprises negotiating with the second UE, based at least in part on the sidelink connection between the first UE and the second UE, to determine whether the primary component carrier can be used for transmitting the sidelink communication and the other primary component carrier can be used for receiving the sidelink communication.

* * * * *